United States Patent
Butterworth et al.

(10) Patent No.: US 10,158,441 B1
(45) Date of Patent: Dec. 18, 2018

(54) SECURING TIME BETWEEN NODES

(71) Applicant: Apple Inc., Cupertino, CA (US)

(72) Inventors: Ashley I. Butterworth, Santa Clara, CA (US); Matthew X. Mora, Pleasanton, CA (US)

(73) Assignee: Apple Inc., Cupertino, CA (US)

( * ) Notice: Subject to any disclaimer, the term of this patent is extended or adjusted under 35 U.S.C. 154(b) by 13 days.

(21) Appl. No.: 15/612,525

(22) Filed: Jun. 2, 2017

(51) Int. Cl.
*H04J 3/06* (2006.01)
*H04W 56/00* (2009.01)

(52) U.S. Cl.
CPC .......... *H04J 3/0635* (2013.01); *H04J 3/0661* (2013.01); *H04W 56/0015* (2013.01); *H04J 3/0638* (2013.01); *H04J 3/0682* (2013.01); *H04W 56/001* (2013.01)

(58) Field of Classification Search
CPC ...... H04J 3/0635; H04J 3/0638; H04J 3/0661; H04J 3/0682; H04W 56/001; H04W 56/0015; H04L 7/0008; H04L 7/0012
See application file for complete search history.

(56) References Cited

U.S. PATENT DOCUMENTS

| | | | | |
|---|---|---|---|---|
| 7,366,205 B2 * | 4/2008 | Arnold | ...................... | G06F 1/14 370/503 |
| 8,571,008 B2 | 10/2013 | Kim et al. | | |
| 8,856,367 B2 | 10/2014 | Steindl | | |
| 8,954,609 B1 | 2/2015 | Holleman | | |
| 2004/0008973 A1 * | 1/2004 | Marshall | ................... | G06F 1/12 386/202 |
| 2013/0100948 A1 * | 4/2013 | Irvine | ................... | H04J 3/0632 370/350 |
| 2013/0138800 A1 | 5/2013 | Gelter et al. | | |
| 2016/0087900 A1 | 3/2016 | Kolmanic | | |
| 2016/0170437 A1 * | 6/2016 | Aweya | .................. | H04J 3/0667 713/503 |
| 2016/0301749 A1 * | 10/2016 | Diarra | ................... | H04L 67/325 |
| 2016/0359610 A1 * | 12/2016 | Karthik | ................. | H04L 7/0008 |
| 2017/0366331 A1 * | 12/2017 | Vermeulen | ............ | H04L 7/0008 |

FOREIGN PATENT DOCUMENTS

DE   19917354 A1   10/2000

* cited by examiner

*Primary Examiner* — Benjamin H Elliott, IV
(74) *Attorney, Agent, or Firm* — Womble Bond Dickinson (US) LLP (57) ABSTRACT

Systems and methods are provided for validating time between a local clock included in the slave node of a network with a master clock included in the master node of the network. The master node determines a propagation delay between the master node and the slave node, sends a synchronization message to the slave node at a first time, determines an expected receipt time of the synchronization message at the slave node based on the first time, the determined propagation delay between the master node and the slave node, and a rate ratio of the master clock to the local clock, and sends a follow up message to the slave node, the follow up message including the first time and the expected receipt time.

30 Claims, 5 Drawing Sheets

SECURING TIME BETWEEN NODES

FIELD

One aspect of the disclosure herein relates to securing time between nodes.

BACKGROUND

Time synchronization between interconnected nodes in a network is often important to operation of the nodes. Time synchronization typically involves sharing time synchronization messages between the nodes. One protocol that is used to synchronize clocks is generalized precision time protocol (gPTP).

BRIEF DESCRIPTION OF THE DRAWINGS

The embodiments herein are illustrated by way of example and not by way of limitation in the figures of the accompanying drawings in which like references indicate similar elements. It should be noted that references to "an" or "one" embodiment in this disclosure are not necessarily to the same embodiment, and they mean at least one. Also, in the interest of conciseness and reducing the total number of figures, a given figure may be used to illustrate the features of more than one embodiment, and not all elements in the figure may be required for a given embodiment.

DETAILED DESCRIPTION

Several embodiments are now explained with reference to the appended drawings. Whenever aspects are not explicitly defined, the embodiments are not limited only to the parts shown, which are meant merely for the purpose of illustration. Also, while numerous details are set forth, it is understood that some embodiments may be practiced without these details. In other instances, well-known circuits, structures, and techniques have not been shown in detail so as not to obscure the understanding of this description.

As used herein, the term "network" refers without limitation to any network configured to transfer data as groupings called packets. Packet networks can deliver streams of data (composed sequences of packets) to a community of devices. During transfer, packets are buffered and queued, and may experience variable delays and throughput depending on the traffic load in the network. As used herein, the term "master" or "upstream" node refers to a device or interface configured to packetize information for transfer via a packet-based network. The terms "slave" or "downstream" node refers to a device or interface configured to extract information from a packet. A "node" refers to a device which receives packets, and forwards the packets to another device.

The term "timestamp" refers to any indication (sequence of characters or encoded information) of when a certain event occurred as determined by a clock of a node. These definitions are not considered to be limiting and are made only to clarify various aspects discussed herein.

An embodiment of the invention here aims to provide a mechanism for securing time according to gPTP (e.g., as defined by IEEE 802.1AS) such that it can be used in applications that must trust that the time being synchronized has not been tampered with while in the process of being synchronized between nodes.

By virtue of the embodiments described herein, it is possible to validate a timestamp, a clock rate ratio, and a propagation delay, such that a secure clock synchronization may be performed. In addition, validation of the timestamp, the clock rate ratio, and the propagation delay may be used for testing and diagnostics.

Figure 1:
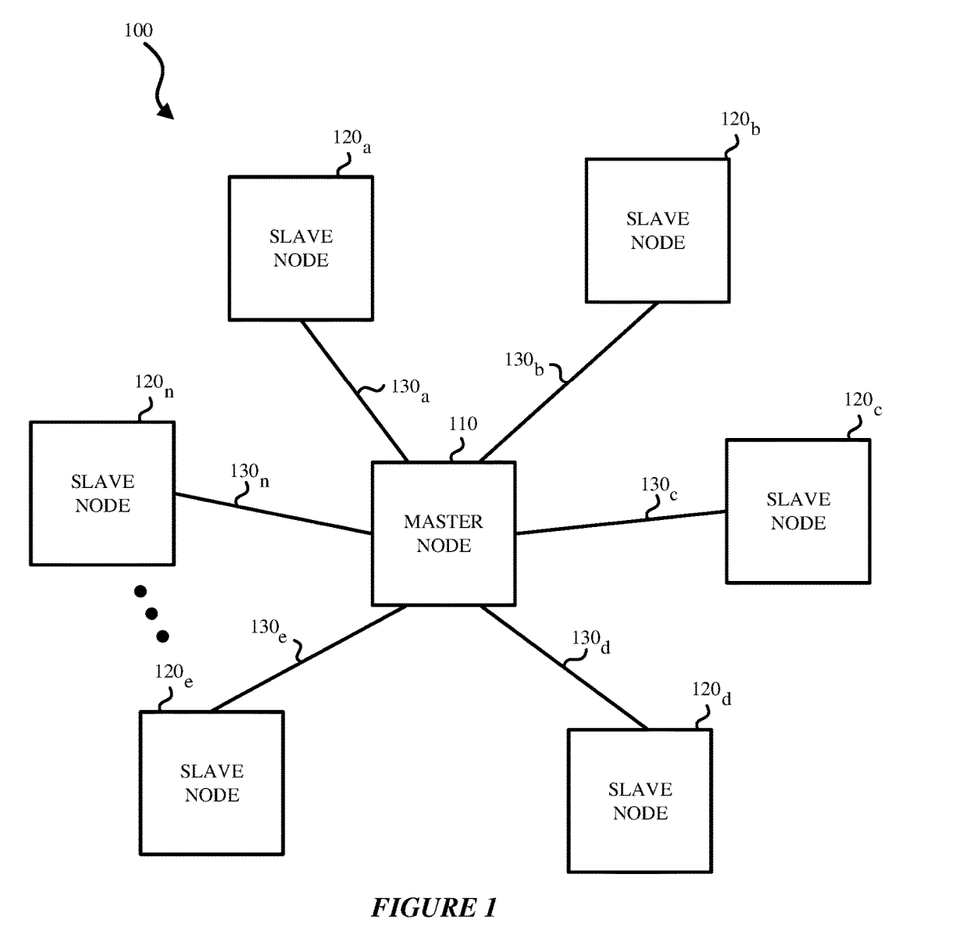
FIG. 1 is a representational view for explaining interconnected nodes in an example network according to an embodiment herein.

FIG. 1 is a representational view illustrating interconnected nodes in an example network according to an embodiment herein. In the illustrated embodiment, the network 100 includes various network elements including a master node 110 in communication with a number of slave nodes 120 (individually slave nodes 120a, 120b, 120c, 120d, 120e . . . 120n) through links 130 (individually links 130a, 130b, 130c, 130d, 130e . . . 130n), respectively. Nodes 110 and 120 are, for example, servers, computers (desktop, laptop, handheld, etc.), routers, firewalls, gateways, network and personal media devices, electronic devices and mobile devices, etc.

Each of nodes 110 and 120 is generally a time-aware system including its own local clock source, and each of slave nodes 120 is capable of synchronizing its own local clock with the clock of a node that has been designated as a master node (such as master node 110.) Each of nodes 110 and 120 generates a timestamp using its clock and a type of timestamping process, such as a hardware-implemented process or a software-implemented process. For example, with respect to hardware-implemented timestamping, when a message departs from or arrives at a node, special hardware generates a timestamp from the local clock. With respect to software-implemented timestamping, when a message reaches the application layer of a node, a processor executes a software program or computer-executable method stored in a memory in order to generate a timestamp based on the local clock. Generally, a timestamp generated by a hardware-implemented process is more accurate than a timestamp generated by a software-implemented process. In one embodiment, timestamps formats are implemented in nanoseconds.

Links 130 are of a wired type (e.g., Ethernet) or a wireless type, and each type of link between master node 110 and slave nodes 120 has different accuracy metrics for performance of time synchronization. For example, a timestamp provided in a time synchronization message over a wired link type is typically more accurate than a timestamp provided in a time synchronization message over a wireless link type. Using links 130, master node 110 and slave nodes 120 exchange messages in order to perform a propagation delay transaction and to perform a time synchronization transaction, as discussed in more detail in connection with FIG. 2.

Although FIG. 1 illustrates an example network configuration, it will be understood that the disclosure herein relates to any configuration of networks, including point-to-point networks, networks connected by a bus, star networks, ring networks, mesh networks, hybrid networks, and daisy chain networks.

Figure 2:
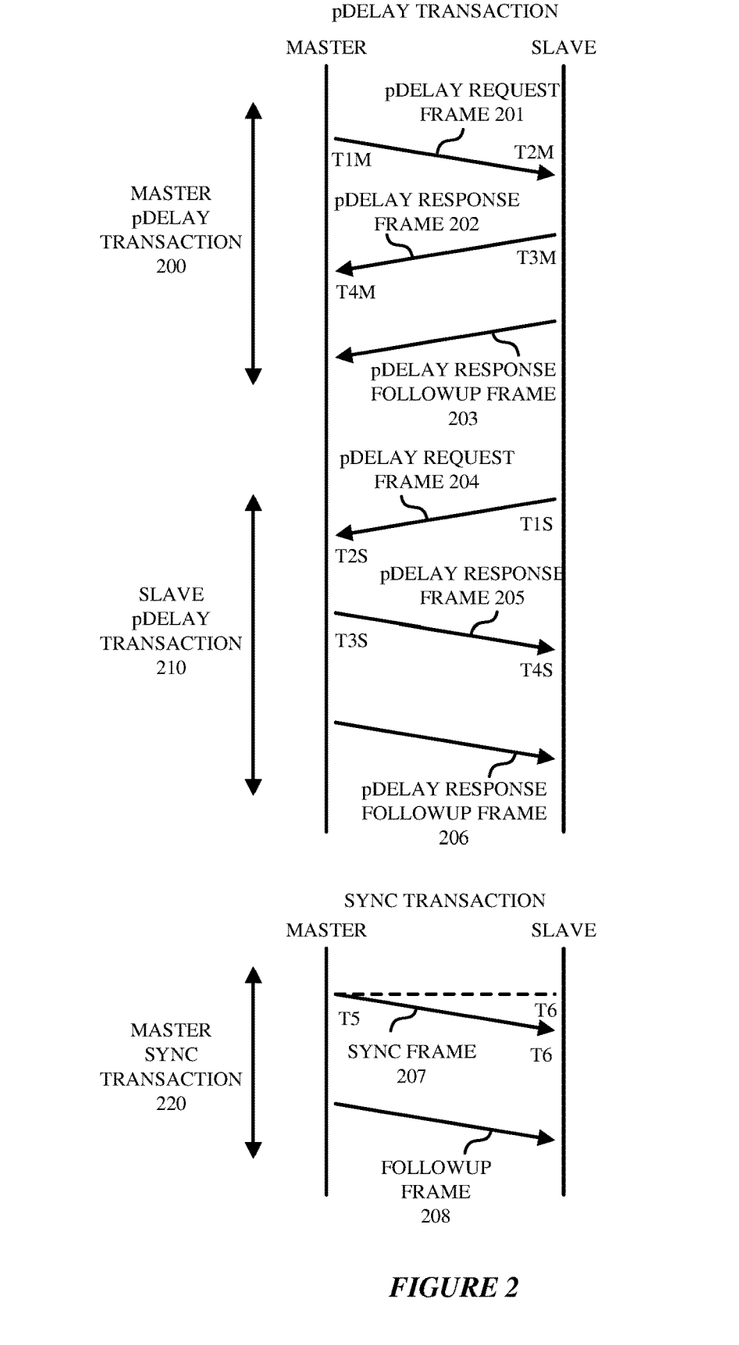
FIG. 2 is an example sequence diagram for explaining securing time between nodes according to an embodiment herein.

FIG. 2 is an example sequence diagram for explaining securing time between a master node (e.g., master node 110) and one or more slave nodes (e.g., one or more of slave nodes 120) according to an embodiment herein.

As illustrated in FIG. 2, according to generalized precision time protocol (gPTP), both the master node and the slave node perform a propagation delay (pDelay) transaction (e.g., 200, 210). In particular, periodically (e.g., once per second), the master node sends to the slave node a message (e.g., pDelay Request Frame 201) at a first time indicated by an egress timestamp T1M. The slave nodes receives the pDelay Request Frame 201 at a second time indicated by an ingress timestamp T2M. The slave node sends to the master node a pDelay Response Frame 202 at a third time indicated by an egress timestamp T3M, the pDelay Response Frame 202 including the timestamp T2M. The master node receives the pDelay Response Frame 202 at a fourth time indicated by an ingress timestamp T4M. The slave node also sends a Response FollowUp Frame 203, which includes the timestamp T3M, such that the master node is aware of T1M, T2M, T3M and T4M. From these values, the master node calculates a clock rate ratio between the clock of the master node and the clock of the slave node, and a propagation delay between the master node and the slave node. In one embodiment, the master node also calculates a clock relationship between the clock of the master node and the clock of the slave node.

In one embodiment, the clock rate ratio is defined as ratio of the average period of the clock of the master node to average period of clock of the slave node. For example, over time, a series of timestamps is obtained by the node. The differences between the timestamps are tracked over time and the rate at which the timestamps are advancing is determined in order to calculate the clock rate ratio. In particular, a time pair may be obtained from the timestamps (e.g., T1M to T4M), and if it is assumed the second value in the time pair is the first value multiplied by the rate ratio, then the rate ratio may be calculated using the time pairs. For example, the clock rate ratio (RR) may be calculated by the master node according to the following equation:

$$RRms=(((T1M[x]+T4M[x])/2)-((T1M[x-1]+T4M[x-1])/2))/(((T2M[x]+T3M[x])/2)-((T2M[x-1]+T3M[x-1])/2))$$ (equation 1)

In one embodiment, the propagation delay may be calculated based on the timestamps T1M to T4M and the calculate clock rate ratio (RR). For example, the propagation delay (PD) may be calculated by the master node according to the following equation:

$$PDm=((T4M-T1M)-RRms(T3M-T2M))/2$$ (equation 2)

The slave node performs a similar process 210 in which it periodically (e.g., once per second) sends a pDelay Request Frame 204 and the master node responds with a pDelay Response Frame 205 and Response FollowUp Frame 206, such that the slave node is aware of times T1S, T2S, T3S and T4S. From these values, the slave node calculates a clock rate ratio between the clock of the slave node and the clock of the master node, a propagation delay between the slave node and the master node, and a clock relationship between the slave node and the master node. For example, similar to the master node, the clock rate ratio (RR) may be calculated by the slave node according to the following equation:

$$RRsm=(((T1S[x]+T4S[x])/2)-((T1S[x-1]+T4S[x-1])/2))/(((T2S[x]+T3S[x])/2)-((T2S[x-1]+T3S[x-1])/2))$$ (equation 3)

Also similar to the master node, the propagation delay (PD) may be calculated by the slave node according to the following equation:

$$PDs=((T4S-T1S)-RRsm(T3S-T2S))/2$$ (equation 4)

In one embodiment, the slave node may perform this propagation delay transaction at the same time (simultaneously) that the master node is performing the propagation delay transaction. In one embodiment, the slave node is asynchronous to the master node and may be performing the propagation delay transaction at a different rate than the master node. In one embodiment, the slave node performs the propagation delay transaction at a similar time as the master node (e.g., within a time range of the master node performing the propagation delay transaction).

Also according to gPTP, a synchronization transaction 220 is periodically (e.g., 8 times a second) performed by the master node utilizing the rate ratio and propagation delay calculated by the master node from the propagation delay transaction. In particular, the master node transmits to the slave node a Sync Frame 207 at a time indicated by an egress timestamp T5, and the slave node notes the time of receipt of the Sync Frame indicated by an ingress timestamp T6. The master node also sends to the slave node a FollowUp Frame 208 including the timestamp T5, such that the slave node is aware of times T5 and T6. In one embodiment, the slave node may determine a time T6' that corresponds to T6 adjusted by the propagation delay (PD) calculated by the slave node, as follows:

$$T6'=T6-PDs$$ (equation 5)

This provides a cross timestamp allowing synchronization between the clock of the slave node and the clock of the master node.

If the master node has been designated the "grandmaster" node, the precise origin timestamp may be directly defined as the timestamp T5. If the master node has not been designated the "grandmaster" node, then the precise origin timestamp may be calculated based on the cross timestamp calculated by the slave node and the egress timestamp T5. The "grandmaster" node may refer to the node including the clock to which all other clocks of the network synch and may be determined by a best master clock algorithm.

Generally, for performing a synchronization transaction 220, it is assumed that the calculated pDelay will not change between the time it was calculated and the next time the synchronization transaction 220 is performed. However, in situations where one or more of messages 201-208 are delayed, the calculated pDelay may not be accurate and the determined time pair will therefore also be inaccurate.

To address these situations, in the embodiment of FIG. 2, the synchronization transaction 220 is enhanced by including in the FollowUp Frame 208 extra information which can be used to validate the ingress timestamp T6 and the calculated synchronization values. In one embodiment, this information may be included in an additional type length value (TLV). Generally, the FollowUp Frame 208 sent from the master node to the slave node allows for use of the pDelay measurement made by the master node by including a calculated expected value of the timestamp T6. The expected value of the timestamp T6 may generally be calculated by converting timestamp T5 to the time domain of the slave node using the clock rate ratio and the clock relationship, the timestamp T6 corresponding to the pDelay calculated by the master node plus (e.g., added to) the converted timestamp T5. Thus, the expected value of the timestamp T6 corresponds to the time the master node expects that the slave node should receive Sync Frame 207. For example, the expected value of the timestamp T6 (expected T6) may be calculated by the following equation:

$$\text{expected } T6 = ((T5+PDm)-((T1M[x]+T4M[x])/2))/RRms+(T2M[x]+T3M[x])/2) \quad \text{(equation 6)}$$

Using the expected value of the timestamp T6, the slave node can then compare the actual ingress timestamp T6 with the expected value of the timestamp T6 to determine whether the actual ingress timestamp T6 is within some predetermined range of the expected value of the timestamp T6. If the actual ingress timestamp T6 is not within the predetermined range, the slave node determines that the Sync Frame is not secure.

Figure 3A:
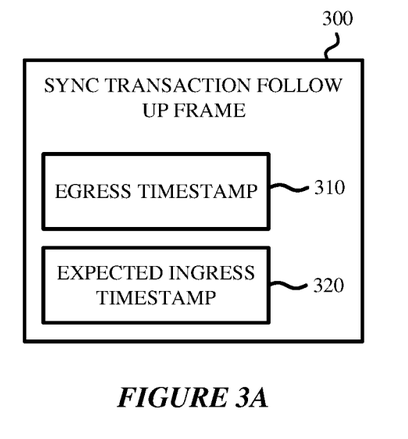
FIGS. 3A-3B represents an example for explaining follow up frames sent by a master node during a time synchronization transaction according to embodiments herein.

One example of a FollowUp Frame is illustrated in FIG. 3A. As illustrated in the embodiment of FIG. 3A, the FollowUp Frame 300 may include the timestamp T5 indicating the time at which the master node sent the sync frame 207 to the slave node (referred to in FIG. 3A as the egress timestamp 310), as well as the expected value of the timestamp T6 indicating the time at which the slave node receives the sync frame 207 (referred to in FIG. 3A as the expected ingress timestamp 320).

In one embodiment, the master node also calculates an expected clock rate ratio which can also be used to validate the pDelay measurements. In particular, the TLV included in the FollupUp Frame 208 may include this expected clock rate ratio calculated by the master node and slave node may use the expected clock rate ratio to validate the clock rate ratio calculated by the slave node according to equation 3. For example, the slave node may compare the clock rate ratio determined by the slave node according to equation 3 with the expected clock rate ratio determined by the master node to determine whether the clock rate ratio determined by the slave node according to equation 3 is within a predetermined range of the expected clock rate ratio determined by the master node. In one embodiment, it is assumed that the clock rate ratio should be very close to 1.

In one embodiment, the master node may calculate an expected propagation delay (expected PD) using the propagation delay calculated by the master according to equation 2 and the clock rate ratio (RR) calculated by the master according to equation 1. For example, the expected PD may be calculated using the following equation:

$$\text{expected } PD = PDm/RRms \quad \text{(equation 7)}$$

The FollowUp Frame 208 may include the expected PD calculated by the master node, and the slave node may use the expected PD to validate the propagation delay calculated by the slave node according to equation 4. For example, the slave node may compare the propagation delay determined by the slave node according to equation 4 with the expected propagation delay determined by the master node to determine whether the propagation delay determined by the slave node according to equation 4 is within a predetermined range of the expected propagation delay determined by the master node.

Figure 3B:
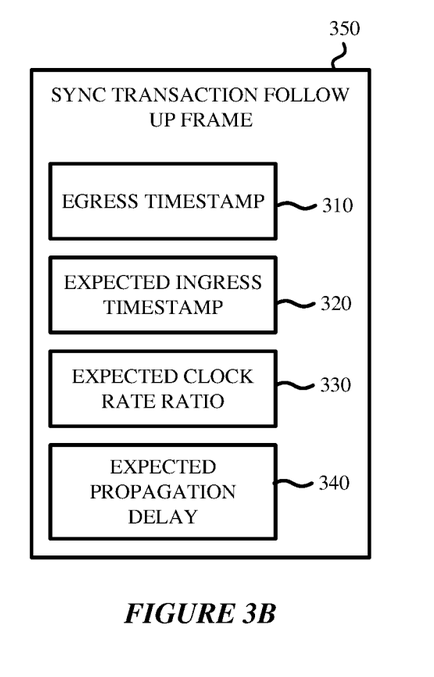

A second example of a FollowUp Frame is illustrated in FIG. 3B. As illustrated in the embodiment of FIG. 3B, in addition to the egress timestamp 310 and the expected ingress timestamp 320, the FollowUp Frame 350 includes the expected clock rate ratio 330 and the expected propagation delay 340. Of course, although the FollowUp Frame 350 includes both the expected clock rate ratio 330 and the expected propagation delay in the embodiment of FIG. 3B, in other embodiments the FollowUp Frame may contain only one or the other.

Thus, FollowUp Frame 208 provides the expected value of the timestamp T6 such that the slave node can then verify that the actual ingress timestamp T6 is within some predetermined range of the expected value of the timestamp T6. In addition, the FollowUp Frame 208 may provide the expected clock rate ratio and/or the expected propagation delay, such that the slave node can verify its pDelay calculations. The FollowUp Frame 208 may therefore generally provide synchronization information which can be used by the slave node to validate the received synchronization frame 207.

Once one or more of the timestamp, the clock rate ratio, and the propagation delay are validated, validated clock synchronization may be performed. In addition, validation of the timestamp, the clock rate ratio and the propagation delay may be used for testing and diagnostics.

It should be noted that the embodiment of FIG. 2 applies peer-to-peer, where each node in a chain implements time synchronization (as opposed to end-to-end), over a single communication link (e.g., 130).

In the embodiment of FIG. 2, the network system applies a form of integrity protection to network packets such that the information contained in a packet can be trusted by the receiving node. This can be accomplished through an integrated signing mechanism or through an external authenticating or encrypting mechanism (e.g., MACSec).

Figure 4:
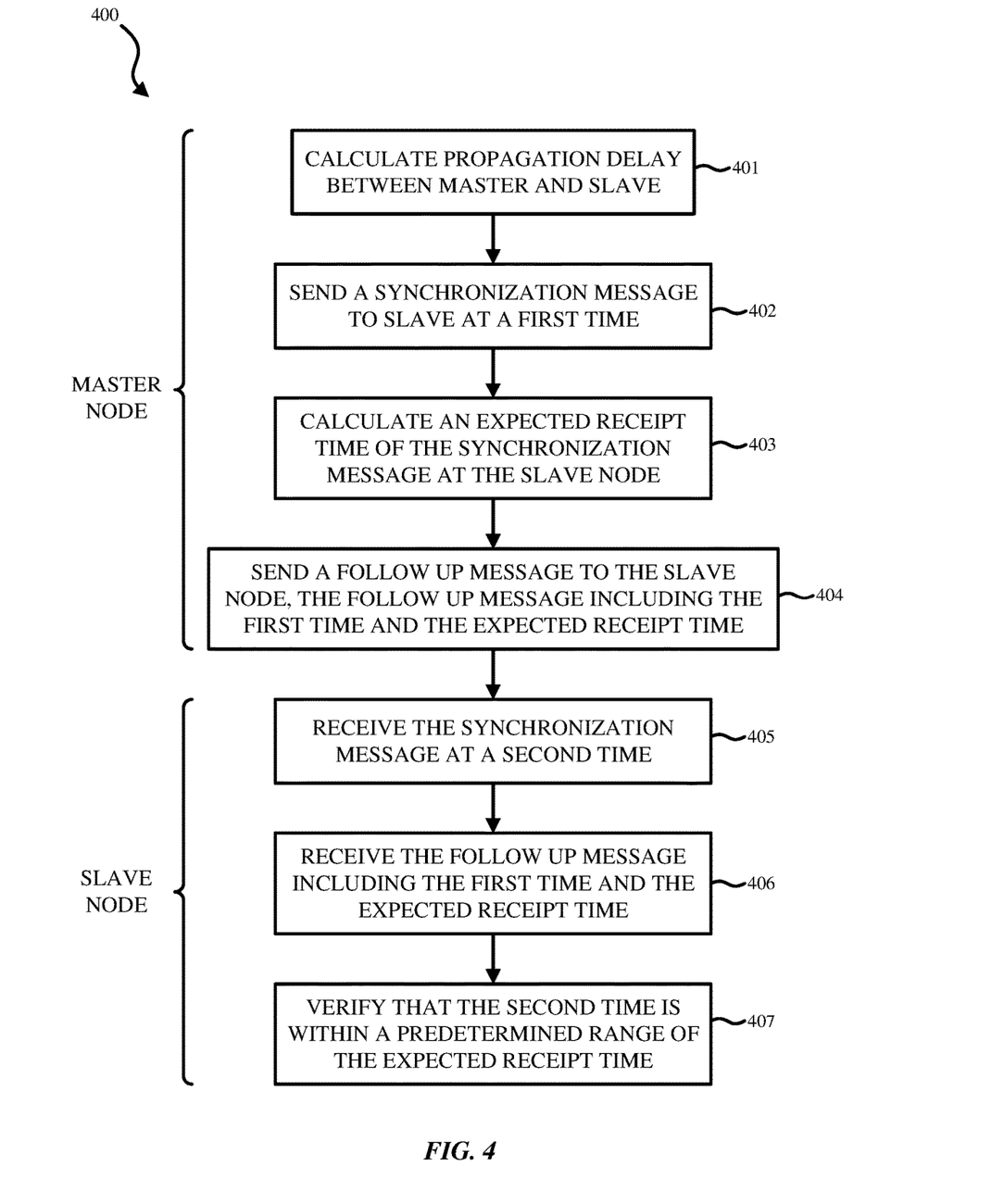
FIG. 4 is a flow diagram for explaining a process of securing time between nodes according to an embodiment herein.

FIG. 4 is a flow diagram illustrating a time synchronization process between a slave node and a master node according to an embodiment herein. In this regard, the following embodiments may be described as a process 400, which are usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc. Process 400 may be performed by processing logic that includes hardware (e.g. circuitry, dedicated logic, etc.), software (e.g., embodied on a non-transitory computer readable medium), or a combination thereof.

In the embodiment of FIG. 4, blocks 401-404 are executed by master node 110 and blocks 405-407 are executed by one or more slave nodes 120. In this regard, although process 400 is described in connection with the network configuration illustrated in FIG. 1, it should be understood that these processes may be applied to other network configurations.

Referring to FIG. 4, at block 401 master node 110 calculates a propagation delay between the master node 110 and one of the slave nodes 120, for example, according to equation 2 discussed above. At block 402, master node 110 sends a synchronization message (e.g., synch frame 207) to the slave node at a first time (e.g., T5). At block 403, master node 110 calculates an expected receipt time of the synchronization message at the slave node (e.g., expected value of the timestamp T6), based on the first time (e.g., T5), the calculated propagation delay between the master node and the slave node (e.g., PD calculated by equation 2 at block 401), and a clock rate ratio of the master clock and the local clock (e.g., RR calculated by equation 1). At block 404, master node 110 sends a follow up message (e.g., FollowUp Frame 208) to the slave node 120, the follow up message including the first time (e.g., T5) and the expected receipt time (e.g., expected value of the timestamp T6).

At block 405, slave node 120 receives the synchronization message (e.g., synch frame 207) from the master node 110 at a second time (e.g., T6). At block 406, slave node 120 receives the follow up message (e.g., FollowUp Frame 208) including the first time (e.g., T5) and the expected receipt time (e.g., expected value of the timestamp T6). At block 407, slave node 120 verifies that the second time (e.g., T6) is within a predetermined range of the expected receipt time (e.g., expected value of the timestamp T6).

Figure 5:
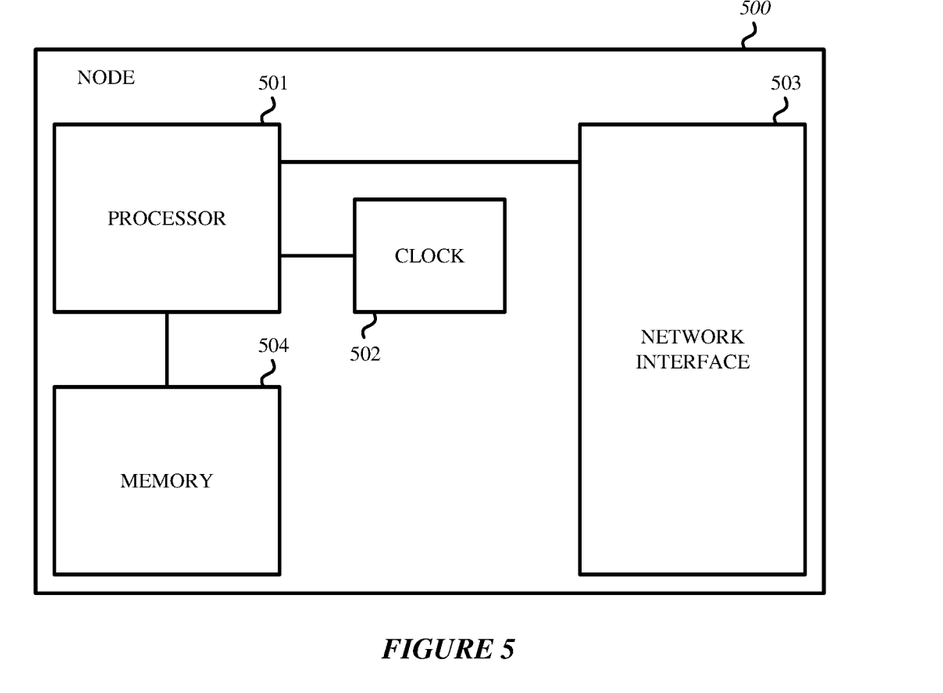
FIG. 5 is a representational view for explaining an example node according to embodiments herein.

FIG. 5 is a representational view illustrating an example node 500 according to embodiments herein. Node 500 is an example of nodes 110 and 120 used for implementing the techniques disclosed herein. Node 500 includes a processor 501, which can include one or more processing devices. Examples of processor 501 include without limitation a microprocessor, an application-specific integrated circuit (ASIC), a state machine, or other suitable processing device. Processor 501 is communicatively coupled to a computer-readable storage medium, such as memory 504, and accesses information stored in memory 504, such as timestamps. Memory 504 also stores computer-executable instructions that when executed by processor 501 cause the processor 501 to perform the operations described herein, such as those described above in connection with FIGS. 1-4. Memory 504 may be, for example, solid-state memories, optical and magnetic media or any other non-transitory machine-readable medium. Non-limiting examples of memory 504 include a hard drive, compact disc, flash memory, non-volatile memory, volatile memory, magnetic disk(s), etc. Node 500 also includes a network interface 503 for communicating with other nodes of the network, and clock 502 for generating timestamps. As discussed above, clock 502 may be implemented by hardware or by software.

FIG. 5 is merely one example of a particular implementation and is merely to illustrate the types of components that may be present in a node. While the node 500 is illustrated with various components, it is not intended to represent any particular architecture or manner of interconnecting the components; as such details are not germane to the embodiments herein. It will also be appreciated that network computers, handheld computers, mobile phones, servers, and/or other data processing systems which have fewer components or perhaps more components may also be used with the embodiments herein. Accordingly, the processes described herein are not limited to use with the hardware and software of FIG. 5.

The processes and blocks described herein are not limited to the specific examples described and are not limited to the specific orders used as examples herein. Rather, any of the processing blocks may be re-ordered, combined or removed, performed in parallel or in serial, as necessary, to achieve the results set forth above. The processing blocks associated with implementing the structures and processes disclosed herein may be performed by one or more programmable processors executing one or more computer programs stored on a non-transitory computer readable storage medium to perform the functions of the system. All or part of the network may be implemented as, special purpose logic circuitry (e.g., an FPGA (field-programmable gate array) and/or an ASIC (application-specific integrated circuit)). All or part of the network may be implemented using electronic hardware circuitry that include electronic devices such as, for example, at least one of a processor, a memory, a programmable logic device or a logic gate. Further, processes can be implemented in any combination hardware devices and software components.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of an audio system, or similar electronic device, that manipulates and transforms data represented as physical (electronic) quantities within the system's registers and memories into other data similarly represented as physical quantities within the system memories or registers or other such information storage, transmission or display devices.

While certain embodiments have been described and shown in the accompanying drawings, it is to be understood that such embodiments are merely illustrative of and not restrictive, and the embodiments are not limited to the specific constructions and arrangements shown and described, since various other modifications may occur to those of ordinary skill in the art. The description is thus to be regarded as illustrative instead of limiting.

What is claimed is:

1. A method of validating time between a local clock included in a slave node of a network with a master clock included in a master node of the network, the method comprising:
   in the master node:
   determining a propagation delay between the master node and the slave node;
   sending a synchronization message to the slave node at a first time;
   determining an expected receipt time of the synchronization message at the slave node, based on the first time, the determined propagation delay between the master node and the slave node, and a rate ratio of the master clock to the local clock; and
   sending a follow up message to the slave node, the follow up message including the first time and the expected receipt time.

2. The method of claim 1, the method further comprising:
   in the slave node:
   receiving the synchronization message at a second time;
   receiving the follow up message including the first time and the expected receipt time; and
   determining whether the second time is within a predetermined range of the expected receipt time.

3. The method of claim 1 wherein the expected receipt time is determined by converting the first time to a time domain of the slave node using the rate ratio and adding the converted first time to the propagation delay determined by the master node.

4. The method of claim 1 wherein the rate ratio is determined by the master node by a propagation delay transaction performed between the master node and the slave node.

5. The method of claim 1, the method further comprising:
   in the master node:
   determining an expected propagation delay using the propagation delay determined by the master node and the rate ratio, wherein the follow up message further includes the expected propagation delay.

6. The method of claim 5, the method further comprising:
in the slave node:
determining a propagation delay between the slave node and the master node; and
determining whether the propagation delay determined by the slave node is within a predetermined range of the expected propagation delay.

7. The method of claim 1, the method further comprising:
in the master node:
determining an expected rate ratio, wherein the follow up message further includes the expected rate ratio.

8. The method of claim 7, the method further comprising:
in the slave node:
determining a rate ratio of the local clock to the master clock; and
determining whether the rate ratio determined by the slave node is within a predetermined range of the expected rate ratio.

9. The method of claim 1 wherein synchronization of the local clock included in the slave node of the network with the master clock included in the master node of the network is performed according to generalized precision time protocol.

10. The method of claim 1 wherein synchronization of the local clock included in the slave node of the network with the master clock included in the master node of the network is performed over a single link of the network.

11. A master node interconnected to a slave node in a network, wherein time is validated between a local clock included in the slave node and a master clock included in a master node, the master node comprising:
a network interface constructed to send a synchronization message to the slave node at a first time;
a processor coupled to a memory and constructed to determine a propagation delay between the master node and the slave node, and to determine an expected receipt time of the synchronization message at the slave node, based on the first time, the determined propagation delay between the master node and the slave node, and a rate ratio of the master clock to the local clock,
wherein the network interface is further constructed to send a follow up message to the slave node, the follow up message including the first time and the expected receipt time.

12. The master node of claim 11, wherein the slave node receives the synchronization message at a second time, receives the follow up message including the first time and the expected receipt time, and determines whether the second time is within a predetermined range of the expected receipt time.

13. The master node of claim 11 wherein the expected receipt time is determined by converting the first time to a time domain of the slave node using the rate ratio and adding the converted first time to the propagation delay determined by the master node.

14. The master node of claim 11 wherein the rate ratio is determined by the master node by a propagation delay transaction performed between the master node and the slave node.

15. The master node of claim 11 the processor being further constructed to determine an expected propagation delay using the propagation delay determined by the master node and the rate ratio, wherein the follow up message further includes the expected propagation delay.

16. The master node of claim 15 wherein the slave node determines a propagation delay between the slave node and the master node and determines whether the propagation delay determined by the slave node is within a predetermined range of the expected propagation delay.

17. The master node of claim 11 the processor being further constructed to determine an expected rate ratio, wherein the follow up message further includes the expected rate ratio.

18. The master node of claim 17 wherein the slave node determines a rate ratio of the local clock to the master clock and determines whether the rate ratio determined by the slave node is within a predetermined range of the expected rate ratio.

19. The master node of claim 11 wherein the synchronization of the local clock included in the slave node of the network with the master clock included in the master node of the network is performed according to generalized precision time protocol.

20. The master node of claim 11 wherein synchronization of the local clock included in the slave node of the network with the master clock included in the master node of the network is performed over a single link of the network.

21. A non-transitory computer-readable storage medium storing executable program instructions which when executed by a master node interconnected to a slave node perform a method for validating time between a local clock included in the slave node of a network with a master clock included in the master node of the network, the method comprising:
determining a propagation delay between the master node and the slave node;
sending a synchronization message to the slave node at a first time;
determining an expected receipt time of the synchronization message at the slave node, based on the first time, the determined propagation delay between the master node and the slave node, and a rate ratio of the master clock to the local clock; and
sending a follow up message to the slave node, the follow up message including the first time and the expected receipt time.

22. The non-transitory computer-readable storage medium of claim 21, the method further comprising:
in the slave node:
receiving the synchronization message at a second time;
receiving the follow up message including the first time and the expected receipt time; and
determining whether the second time is within a predetermined range of the expected receipt time.

23. The non-transitory computer-readable storage medium of claim 21 wherein the expected receipt time is determined by converting the first time to a time domain of the slave node using the rate ratio and adding the converted first time to the propagation delay determined by the master node.

24. The non-transitory computer-readable storage medium of claim 21 wherein the rate ratio is determined by the master node by a propagation delay transaction performed between the master node and the slave node.

25. The non-transitory computer-readable storage medium of claim 21, the method further comprising:
in the master node:
determining an expected propagation delay using the propagation delay determined by the master node and the rate ratio, wherein the follow up message further includes the expected propagation delay.

26. The non-transitory computer-readable storage medium of claim 25, the method further comprising:
in the slave node:
determining a propagation delay between the slave node and the master node; and
determining whether the propagation delay determined by the slave node is within a predetermined range of the expected propagation delay.

27. The non-transitory computer-readable storage medium of claim 21, the method further comprising:
in the master node:
determining an expected rate ratio, wherein the follow up message further includes the expected rate ratio.

28. The non-transitory computer-readable storage medium of claim 27, the method further comprising:
in the slave node:
determining a rate ratio of the local clock to the master clock; and
determining whether the rate ratio determined by the slave node is within a predetermined range of the expected rate ratio.

29. The non-transitory computer-readable storage medium of claim 21 wherein synchronization of the local clock included in the slave node of the network with the master clock included in the master node of the network is performed according to generalized precision time protocol.

30. The non-transitory computer-readable storage medium of claim 21 wherein synchronizing of the local clock included in the slave node of the network with the master clock included in the master node of the network is performed over a single link of the network.

* * * * *